July 26, 1932.  W. G. FRASER  1,869,243
PULPING MACHINE
Filed March 24, 1931
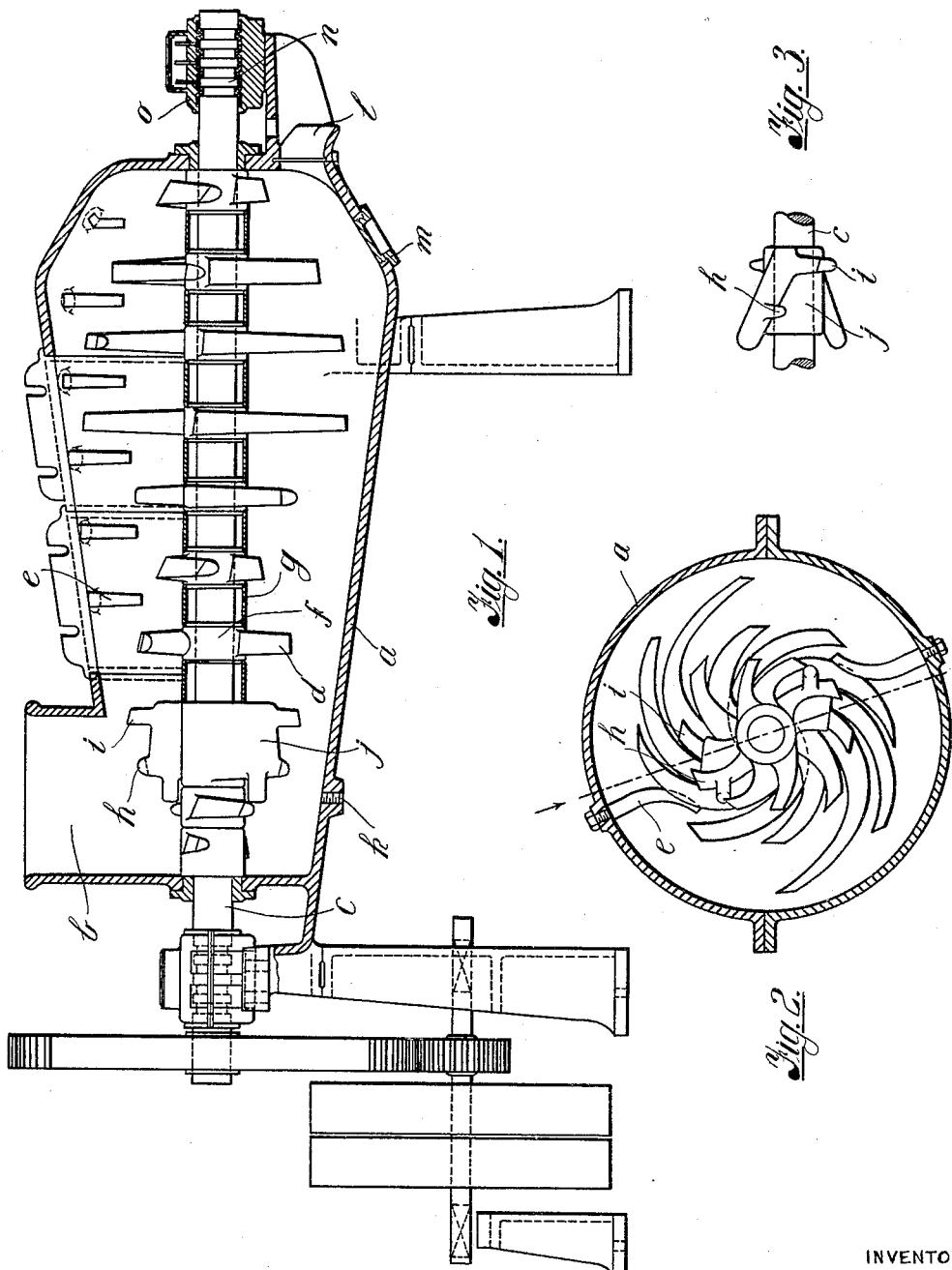
INVENTOR
William G. Fraser
BY
ATTORNEY Patented July 26, 1932

1,869,243

UNITED STATES PATENT OFFICE

WILLIAM GROUNDWATER FRASER, OF FULHAM, LONDON, ENGLAND

PULPING MACHINE

Application filed March 24, 1931, Serial No. 525,002, and in Great Britain March 9, 1931.

This invention relates to machines for the preparation of paper pulp by tearing or shredding paper, wood pulp or like materials and has for its object to provide improvements in machines of this character to enable them to operate in a more certain and efficient manner than hitherto.

According to the invention a pulping machine having a conical body and a number of arms or blades rotatably mounted therein is provided wherein the arms within or adjacent to the feed hopper at one end of the conical body are replaced by a worm device for the purpose of ensuring continuous transfer of material into the conical body of the machine. According to the preferred form of the invention the machine also includes the provision of means to prevent accumulation of material around the central operating shaft between the arms or blades.

Reference will now be made to the accompanying drawing which illustrates by way of example a form of construction according to the invention and in which:—

Figure 1 is a sectional elevation,

Figure 2 is a cross sectional view and

Figure 3 is a detail of the worm device viewed in the direction of the screw in Fig. 2.

The machine illustrated comprises a conical body or casing $a$ provided with a feed hopper $b$ at the end of smaller diameter. Through the conical body $a$ passes a horizontal power driven shaft $c$ carrying a number of helically arranged arms or blades $d$ increasing in size towards the larger end of the casing $a$ and co-operating with arms $e$ fixed on the upper and lower portions of the casing $a$ as shown in Fig. 2. The arms $d$ are mounted on bosses $f$ secured to the shaft $c$ and in order to prevent accumulation of strings or other material in the spaces around the shaft between the bosses tubular elements $g$ of the same diameter as the bosses are disposed around the shaft between them so as to close up the spaces completely.

At the entrance to the conical chamber $a$ the first two arms of the series $h$ and $i$ are cast in one piece with the portion nearest the root or boss $j$ cast as a worm with the object of pushing the stuff received through the hopper $b$ more easily into the conical chamber $a$ and thereby ensuring a constant feed of material past the arms $d$.

The conical chamber $a$ is provided with an inlet $k$ for water or steam and with an outlet $l$ for the pulped material whilst the lowest portion of the chamber is provided with a cleansing outlet normally closed by a screw cover $m$.

The ends of the shaft $c$ are preferably provided with thrust collars $n$ and the bearings $o$ are made as thrust bearings at either or both ends as shown.

I claim:—

1. A machine for the preparation of paper pulp comprising a substantially conical body, a rotatable shaft disposed longitudinally therein, helically arranged blades on said shaft, stationary blades within said casing coacting with the first mentioned blades to shred material, a worm shaped boss on said shaft to feed material from the smaller end toward the larger end of the conical body, and material shredding means on said boss coacting with the worm thread and operable in a plane substantially transverse to the longitudinal axis of the worm.

2. A machine for the preparation of paper pulp comprising a substantially conical body, a rotatable shaft disposed longitudinally therein, helically arranged blades on said shaft, stationary blades with said casing coacting with certain of the first mentioned blades to shred material, a worm shaped boss on said shaft to feed material from the smaller end toward the larger end of the conical body, a plurality of the first mentioned blades being integral with the worm shaped boss and intersecting the worm thread thereof.

3. A machine for the preparation of paper pulp comprising a substantially conical body, a rotatable shaft disposed longitudinally therein, a plurality of helically arranged blades on said shaft, stationary blades within said casing and coacting with the first mentioned blades to shred material, a feed hopper on the smaller end portion of the casing, means for preventing the accumulation of material around the shaft and to feed material from the smaller end to the larger end of said body comprising a worm shaped boss integral with and generally transverse with respect to two of the shaft blades and disposed adjacent the hopper, and tubular elements disposed between the shaft blades.

In testimony whereof I have hereunto set my hand.

WILLIAM GROUNDWATER FRASER.